US006583751B1

(12) United States Patent
Ferretti et al.

(10) Patent No.: US 6,583,751 B1
(45) Date of Patent: Jun. 24, 2003

(54) PROCESS FOR RADAR MEASUREMENTS OF THE MOVEMENT OF CITY AREAS AND LANDSLIDING ZONES

(75) Inventors: Alessandro Ferretti, Milan (IT); Claudio Prati, Milan (IT); Fabio Rocca, Milan (IT)

(73) Assignee: Politecnico di Milano, Milan (IT)

( * ) Notice: Subject to any disclaimer, the term of this patent is extended or adjusted under 35 U.S.C. 154(b) by 0 days.

(21) Appl. No.: 09/979,150

(22) PCT Filed: Apr. 20, 2000

(86) PCT No.: PCT/EP00/03741

§ 371 (c)(1),
(2), (4) Date: Nov. 20, 2001

(87) PCT Pub. No.: WO00/72045

PCT Pub. Date: Nov. 30, 2000

(30) Foreign Application Priority Data

May 25, 1999 (IT) .......................................... MI99A1154

(51) Int. Cl.⁷ .............................................. G01S 13/90
(52) U.S. Cl. .................. 342/25; 342/114; 342/191; 342/192
(58) Field of Search ............................ 342/25, 28, 114, 342/115, 189, 190, 191, 192, 194, 195, 196

(56) References Cited

U.S. PATENT DOCUMENTS

| | | | |
|---|---|---|---|
| 4,101,891 A | * 7/1978 | Fletcher et al. | 342/25 |
| 4,965,582 A | * 10/1990 | Hellsten | 342/25 |
| 5,053,778 A | * 10/1991 | Imhoff | 342/191 |
| 5,659,318 A | 8/1997 | Madsen et al. | 342/25 |
| 5,726,656 A | 3/1998 | Frankot | 342/25 |
| 5,940,523 A | * 8/1999 | Cornman et al. | 382/100 |
| 5,969,662 A | * 10/1999 | Hellsten | 342/25 |

FOREIGN PATENT DOCUMENTS

| | | | |
|---|---|---|---|
| DE | 3712065 C | * | 9/1988 |
| DE | 19626556 A | | 1/1998 |
| GB | 2104753 A | * | 3/1983 |
| WO | WO 98 02761 A | | 1/1998 |

OTHER PUBLICATIONS

"Extracting line features from synthetic aperture radar (SAR) scenes using a Markov random field model", Hellwich, O.; Mayer, H.; Image Processing, 1996. Proceedings., International Conference on , vol.: 3 , Sep. 16–19, 1996, pp. 883–886 vol. 3.*
"Determination of the age distribution of sea ice from Lagrangian observations of ice motion", Kwok, R.; Rothrock, D.A.; Stern, H.L.; Cunningham, G.F.; Geoscience and Remote Sensing, IEEE Transactions on , vol.: 33 Issue: 2 , Mar. 1995 pp. 392–400.*

(List continued on next page.)

Primary Examiner—John B. Sotomayor
(74) Attorney, Agent, or Firm—Nixon & Vanderhye, P.C.

(57) ABSTRACT

Process for radar measurements of movements of city areas and landsliding zones, characterised in that permanent scatterers are identified through the analysis of N−1 differential interferograms with respect to the same image (master), using a reference digital elevation model (DEM) with vertical precision better that 50 meters. For every pixel of the image selected on the satistical properties of the modulus of the reflectivity, a temporal series of the interferometric phases is generated. Then, differences among temporal series that belong to neighboring pixels are formed (differential temporal series). For every differential temporal series, the linear phase components are calculated in relation to the baseline and the phase components connected to the displacement model, already known, in relation to the time. The relative error between the precise elevation of the pixel and that supplied from the reference DEM is associated with the linear phase component of the differential temporal series in relation to the baseline.

3 Claims, 11 Drawing Sheets

OTHER PUBLICATIONS

"Radar permanent scatterers identification in urban areas: target characterization and sub–pixel analysis", Ferretti, A.; Colesant C.; Prati, C.; Rocca, F.; Remote Sensing and Data Fusion over Urban Areas, IEEE/ISPRS Joint Workshop 2001,p. 52.*

"Radar imagery for environmental geology study of coastal zones in southern Italy", Ricchetti, E.; Geoscience and Remote Sensing Symposium, 2001. IGARSS '01. IEEE 2001 International, vol.: 7 , 2001 p. 3083 vol. 7*

"Extraction of DEM from single SAR based on radargrammetry", Jie Yang; Mingsheng Liao; DaoSheng Du;Info–tech and Info–net, 2001. Proceedings. ICII 2001—Beijing. 2001 InternationalConferences on , vol.: 1, 2001 pp. 212–217.*

"Texture analysis of urban areas in ERS SAR imagery for map updating", Dekker, R.J.; Remote Sensing and Data Fusion over Urban Areas, IEEE/ISPRS Joint Workshop 2001,pp. 226–230.*

"SAR analysis of building collapse by means of the permanent scatterers technique", Ferretti, A.; Ferrucci, F.; Prati, C.; Rocca, F. Geoscience and Remote Sensing Symposium, 2000. Proceedings. IGARSS 2000. IEEE 2000 International, vol. 7pp. 3219–3221.*

Classification of urban environments in SAR images: a fuzzy clustering perspective, Gamba, P.; Savazzi, P.; Geoscience and Remote Sensing Symposium Proceedings, 1998, IGARSS '98 IEEE International , vol.: 1 , Jul. 6–10, 1998 pp. 351–353.*

Reigber, A et al; "Phase Unwrapping By Fusion of Local And Global Methods"; IEEE International Geoscience and Remote Sensing Symposium, US, NY, NY; Aug. 3, 1997; pp. 869–871; XP000753623.

Fazio De M et al; "Dem Reconstruction In Sar Interferometry: Practical Experiences With ERS–1 Sar Data"; Proceeding Of the International Geoscience and Remote Sensing Symposium, US, NY, NY; IEEE; vol. Symp, 13; Aug. 18, 1993; XP000481827.

Griffiths, H; "Interferometric Synthetic Aperture Radar"; Electronics and Communication Engineering Journal, GB, Institution of Electrical Engineers, London; vol. 7, No. 6, Dec. 1, 1995; XP000545120.

* cited by examiner

PROCESS FOR RADAR MEASUREMENTS OF THE MOVEMENT OF CITY AREAS AND LANDSLIDING ZONES

BACKGROUND OF THE INVENTION

The present invention relates to a process for measuring the movement of city areas and landsliding zones.

As is already known, a synthetic aperture radar or SAR produces a bi-dimensional image. One dimension of the image is called range and it is a measurement of the line-of-sight distance from the radar to the object illuminated. The other dimension is called azimuth and is perpendicular to the range.

The measuring operation and the range accuracy are obtained by means of a synthetic aperture radar determining as precise as possible the time that has passed from the transmission of one pulse by the radar to receiving the echo of the illuminated object. The range accuracy is determined by the length of the pulse transmitted. Shorter time pulses ensure a finer resolution.

To obtain a fine resolution of the azimuth it is necessary to use a large physical antenna so that the electromagnetic wave transmitted and received is as similar as possible to a pulse (in the ideal case the pulse has the shape of a Dirac delta).

Similar to optical systems (such as telescopes), that need large apertures to obtain fine resolutions of the image, also a SAR-type radar, of normal precision, that works at a much lower frequency than those of the optical systems, needs an enormous antenna with enormous apertures (hundreds of meters), that cannot be installed on any platform. Nevertheless a SAR-type radar installed on an aeroplane can collect information during the flight and then elaborate it as if it were an antenna. The distance that the aeroplane covers, simulating the length of the antenna, is called synthetic aperture.

The SAR-type radar consists of a coherent radar, that is a radar which measures both the module and the phase of the electromagnetic wave reflected, operating at a frequency which is usually between 400 Mhz and 10 Ghz, and is, as previously said, installed on aeroplanes, and also on orbiting satellites at a height between 250 and 800 Km.

The antenna of the radar is directed towards the earth orthogonally to the direction of the movement of the platform (aeroplane or satellite) with an angle, called "Offnadir", between 20 and 80 degrees in relation to the direction of Nadir, that is, perpendicularly to the earth.

With said system, resolution cells or grids of the earth surface can be generated with a spatial resolution of a few meters. Said cells present a minimum grid of resolution, that is, they have a spacing within which it is possible to distinguish two objects to illuminate.

The most important characteristic of SAR is that it is a coherent image system. It is therefore possible to measure the range difference in two or more SAR images (SAR interferometer) of the same surface with an accuracy of a fraction of the SAR wavelength.

Using focusing techniques that preserve the phase, images are obtained in which every element of the image (pixel) is associated with a complex number resulting from the combination of the backscattering of all the objects belonging to the same ground resolution cell and the phase rotation due to the path.

The phase of every pixel is given by the sum of two terms: the first is the phase of the scatterer $\phi s$ and the second is given by $\phi r = 4\pi r/\lambda$, where r is the radar—resolution cell distance and $\lambda$ is the radar wavelength (with $\lambda = c/(2\pi f)$, where f is the operating frequency of the radar and c is the speed of the light). The second phase term contains millions of cycles because the wavelengths are a few centimeters and the radar sensor—resolution cell distance is a few hundred kms, while the displacement connected to the scatterers is fundamentally random and therefore the phase of a single SAR image is practically unusable. However, if we consider the phase difference between two SAR images taken from slightly different viewing angles, the phase term due to the scatterers is cancelled (at least in first approximation if the angle difference is small) and the residual phase term results $\phi = 4\pi \Delta r/\lambda$ where $\Delta r$ is the difference of the paths between the sensors and the same ground resolution cell. The phase term still contains a very high number of cycles, that is known apart from the high integer multiple of $2\pi$, but passing from one resolution cell to an adjacent one, the variation of the phase is usually small enough not to present ambiguity of $2\pi$. The phase thus deduced is called the interferometric phase and the variation information $\Delta r$ (which is measured in fractions of wavelength $\lambda$) between pixel of the SAR image is connected thereto. Knowing the position of the two sensors, the measure of $\Delta r$ can be used to find the relative elevation between the pixel of the image and therefore generate a digital elevation model ("Digital Elevation Model" or DEM), that is, an electronic reading is taken of the topography of the Earth's surface. On the other hand, if the topography is known, that is a DEM of the area of interest is available (there are special data banks from which one can take these digital models), its contribution to the interferometric phase can be eliminated and possible small surface displacements can be detected. In the case of the satellites ERS-1 and ERS-2 (twin satellites sent into orbit by the European Space Agency, the first, ERS-1, in 1991, the second, ERS-2, in 1995, operating at a frequency of 5.3 GHz, characterised by a 35-day revolution period and by a 20-meter grid resolution), for example, from one passage to the next of the platform (ERS-1 and ERS-2 follow each other at a distance of one day), or of one of the two satellites, several scatterers do not change their behaviour, that is, they keep a high coherence and therefore the cancellation of their phases is practically perfect. This means that the phase measures obtained by means of this technique can measure movements that are even a few millimeters of the Earth's topography.

Nevertheless, the present techniques of differential interferometry have some limits. In fact after a few days, in extended zones, the scatterers lose coherence, that is the scatterers do not remain similar to themselves after a period of time and therefore coherent zones with dimensions exceeding a few resolution cells cannot be identified. In addition, the wavelength of the incident signal and the displacement of it are function of atmospheric conditions. These cause phase rotations that cannot be distinguished from the movements of the ground that are required to be measured.

Another problem is the physical structure of the single scatterer that influences the phase variation in function of the observation direction and therefore of the baseline, that is of the distance between the two satellites projected orthoganally to the view line. If the stable scatterer is a surface that backscatterers and that occupies the entire resolution cell in the range, the phase of the radar echo loses correlation in correspondence with the so called critical baseline (for example in the case of satellites of the ERS type the critical baseline is about 1200 meters). When instead the scatterer is pointwise or is a corner reflector, the phase remains unvaried for much greater baselines.

SUMMARY OF THE INVENTION

In view of the state of the art described, the object of the present invention is to identify a measuring process, which resolves the problems of the present techniques so that the movement of city areas and landsliding zones can be measured in a more reliable manner.

According to the present invention, such object is reached through a process for radar measuring of the movement of city areas and landsliding zones which, having available N>20 images taken with a Synthetic Aperture Radar or SAR over a multi-year period, identifies, for every resolution cell, the scatterers, called permanent scatterers PS, that keep their electromagnetic characteristics unchanged over time, characterized in that said PSs are identified through the following steps:

(a) N−1 differential interferograms are formed in relation to the main image, called master, using a digital elevation model or DEM with vertical accuracy better than 50 meters;

(b) for every pixel of the image of point (a) selected on the statistical properties of the modulus of the reflectivity, a temporal series of the interferometric phases is generated, and then, spatial differences among temporal series that belong to neighbouring pixels are formed;

(c) for every differential temporal series of point (b) the linear phase components are calculated in relation to the baseline and the phase components connected to the displacement model, already known, in relation to the time;

(d) the relative error between the precise elevation of the pixel supplied from DEM of point (a) is associated with the linear phase component of point (c) in relation to the baseline;

(e) the relative movement of the pixel in the direction of the SAR is associated to the polynomial phase variation in relation to the time of point (c);

(f) the phase residuals are formed by subtracting the contributions calculated at points (d) and (e) after a phase unwrapping procedure on the sparse grid of the selected pixels;

(g) the spectral power density of the phase residuals is analysed and (g.1) if the residuals relating to each single image are spatially correlated, attributed to atmospheric artefacts and removed; if (g.2) the further residual dispersion relating to each single image is too large the pixel is discarded.

Said process is characterised in that given a number of PS per surface unit>25 per $Km^2$, after the elaboration of the phase residuals, the atmospheric artefact of every single image is determined by subtracting said artefact from the vertical precision of the DEM.

Thanks to the present invention, a process can be made for identifying the stable scatterers in time, called PS (regardless of the atmospheric conditions and of the type of platform on which the SAR radar is positioned), which can determine the movement of city areas and landsliding zones.

As well, a process can be provided which makes it possible, from the phase dispersion of the PS, to estimate the dimension and construct a network of natural reflectors suitable for identifying the orbital position of any satellite or aeroplane that illuminates the natural network of said PS, or to measure the movements of the PS or of the atmospheric artefact.

BRIEF DESCRIPTION OF THE DRAWINGS

The characteristics and advantages of the present invention result as being evident from the following detailed description of an embodiment thereof, illustrated as non-limiting example in the enclosed drawings, in which.

DETAILED DESCRIPTION OF THE INVENTION

Figure 1:
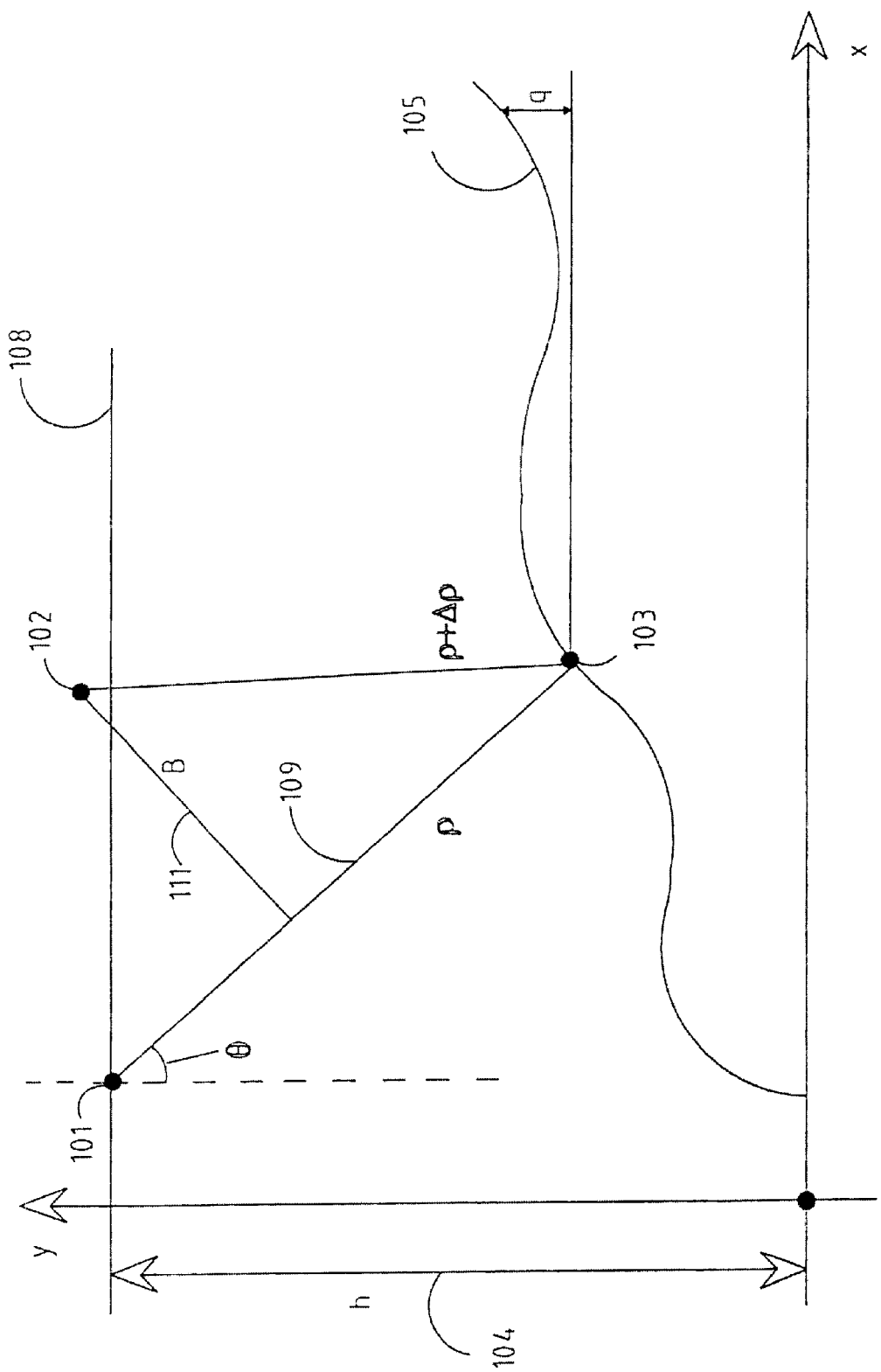
FIG. 1 shows a geometric image of the interferometry SAR in the case of one single cell.

In FIG. 1 the phase difference between two SAR images taken from slightly different viewing angles is shown.

According to what is illustrated in said Figure, there are noted one axis of the x-co-ordinates, representing sea level or another reference surface, one axis of the ordinates, representing the height of sea level, or another reference surface; three points 101, 102, 103; a horizontal line 108 passing through point 101; a vertical line 104, parallel to the axis of the ordinates, indicating the distance "h" between the axis of the x-co-ordinates and the horizontal line 108; a topographic line 105; an acute angle θ; the distance between points 101 and 102, in a normal direction to the view line (called baseline) will be indicated with a segment 111 having length B; the distance 109 between points 101 and 103 is indicated with ρ; the distance 110 between points 102 and 103 is indicated with ρ+Δρ.

If two receiving and transmitting radar antennae, 101 and 102, which illuminate the same surface zone 103 simultaneously are considered, and point 101 is placed at a distance ρ from the ground and point 102 at a distance ρ+Δρ from the ground, the displacement of the illumination path is calculated as $\phi r = 4\pi\rho/\lambda$ with λ as length of incident and reflected wave. It can be noted that the phase difference depends both on the geometric view and the height of point 103 above the reference surface (axis of the x-coordinates). Therefore, if the geometric view can be controlled or is at least known with sufficient accuracy, the topography 105 in relation to point 103 (called q) can be extrapolated from the measure of the phase difference Φq with a precision of several meters, specifically using the expression $$\Phi q = \frac{4\pi}{\lambda} \frac{B}{\rho \sin\theta} q$$

Figure 2:
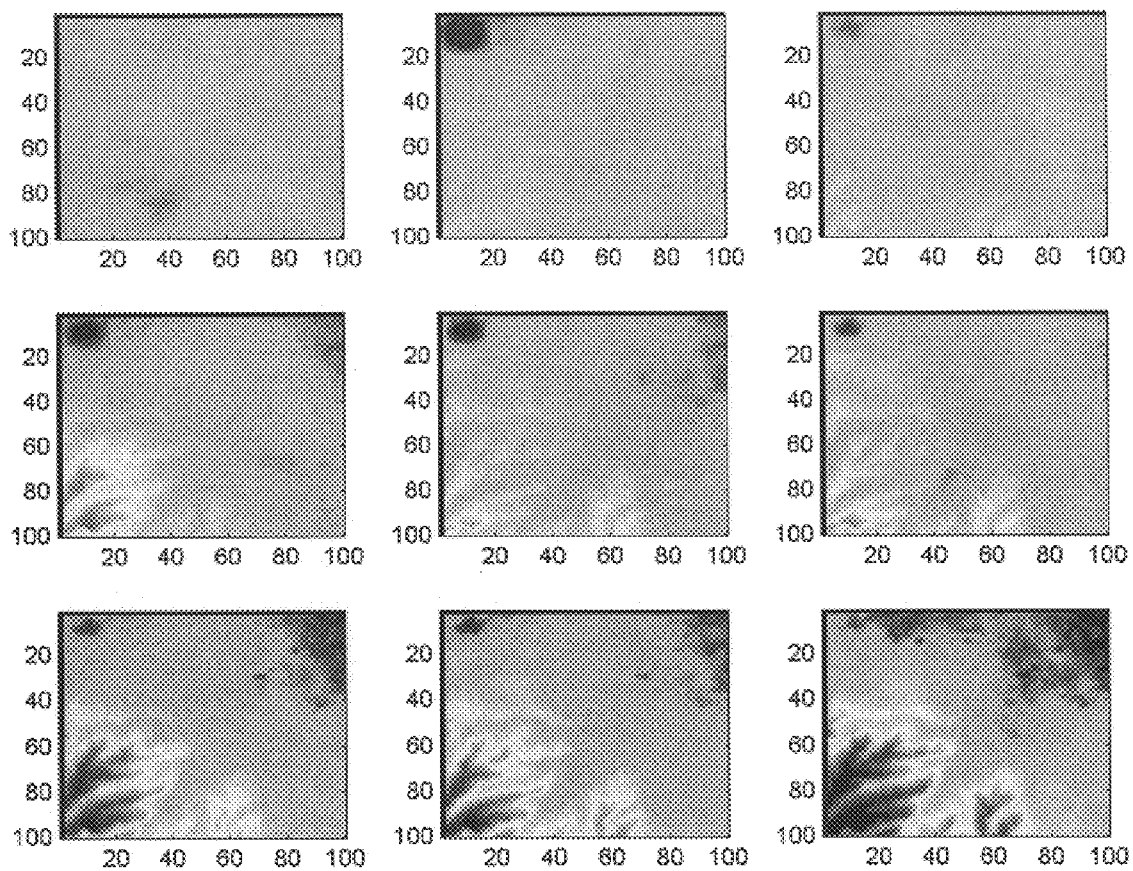
FIG. 2 illustrates some interferograms referring to a specific area.

FIG. 2 shows the interferograms of a specific area generated through the usual computer program using a main image, called "master", and nine secondary images, called "slaves". Each interferogram is characterised in that it has a different baseline, an axis of the x-coordinates indicating the direction of azimuth and an axis of the ordinates, indicating the range direction.

The nine different differential interferograms are made by subtracting from the phase difference of every pixel the contribution of the topography, and using an existing DEM, that is using digital models which are available on the market, with a better vertical accuracy than 50 m.

The reference DEM can also be generated from the high coherence interferometric couples. For example in the case of satellites ERS-1 and ERS-2 the couples of images taken at the distance of a day can be used because after a brief period of time from the passage of said satellites, said zones do not modify their stable scatterers. These couples of images generate high coherence interferometric couples.

Figure 3:
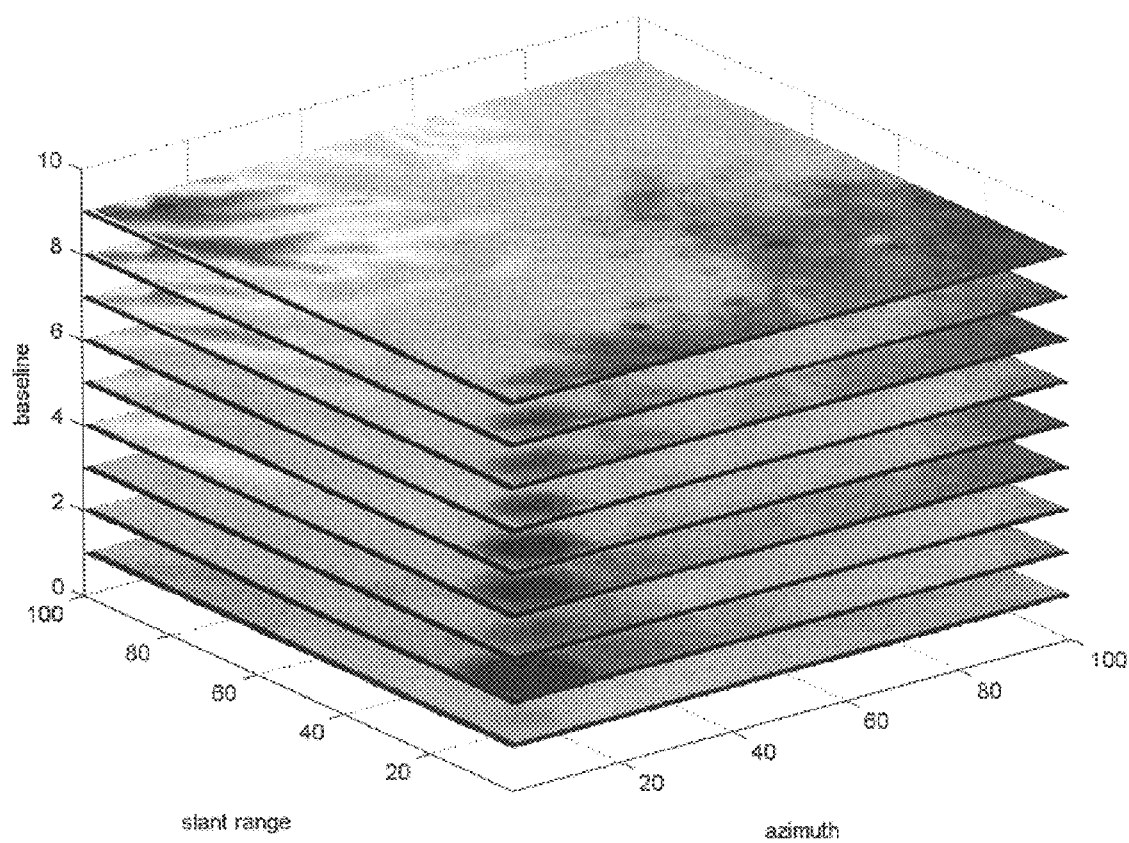
FIG. 3 shows a three-dimensional graph of nine interferograms in function of the baseline.

In FIG. 3, which uses the baseline and distance values of the radar (slant range), nine interferograms of FIG. 2 are shown, generated by the same master image, positioned three-dimensionally, ordered by increasing baselines.

According to said Figure it can be noted that each interferogram is referred to the same ground surface area, but has a different baseline.

Four points, called pixels, are identified with 112, 113, 114 and 115, belonging to a specific interferogram.

Having the nine interferograms available and taking only one point, for example 112, belonging to one of the interferograms, on the basis of the previous formula of Φq this has a phase component, relative to a reference pixel, which increases linearly with the baseline in function of the relative height error. Therefore a mono-dimensional signal is made, as hereunder described with reference to FIG. 4, which represents a sequence of the interferometric phases in function of the baseline.

The method is the same for points 113, 114 and 115 from which the same number of sequences of the interferometric phases are extracted in function of the baseline.

Figure 4:
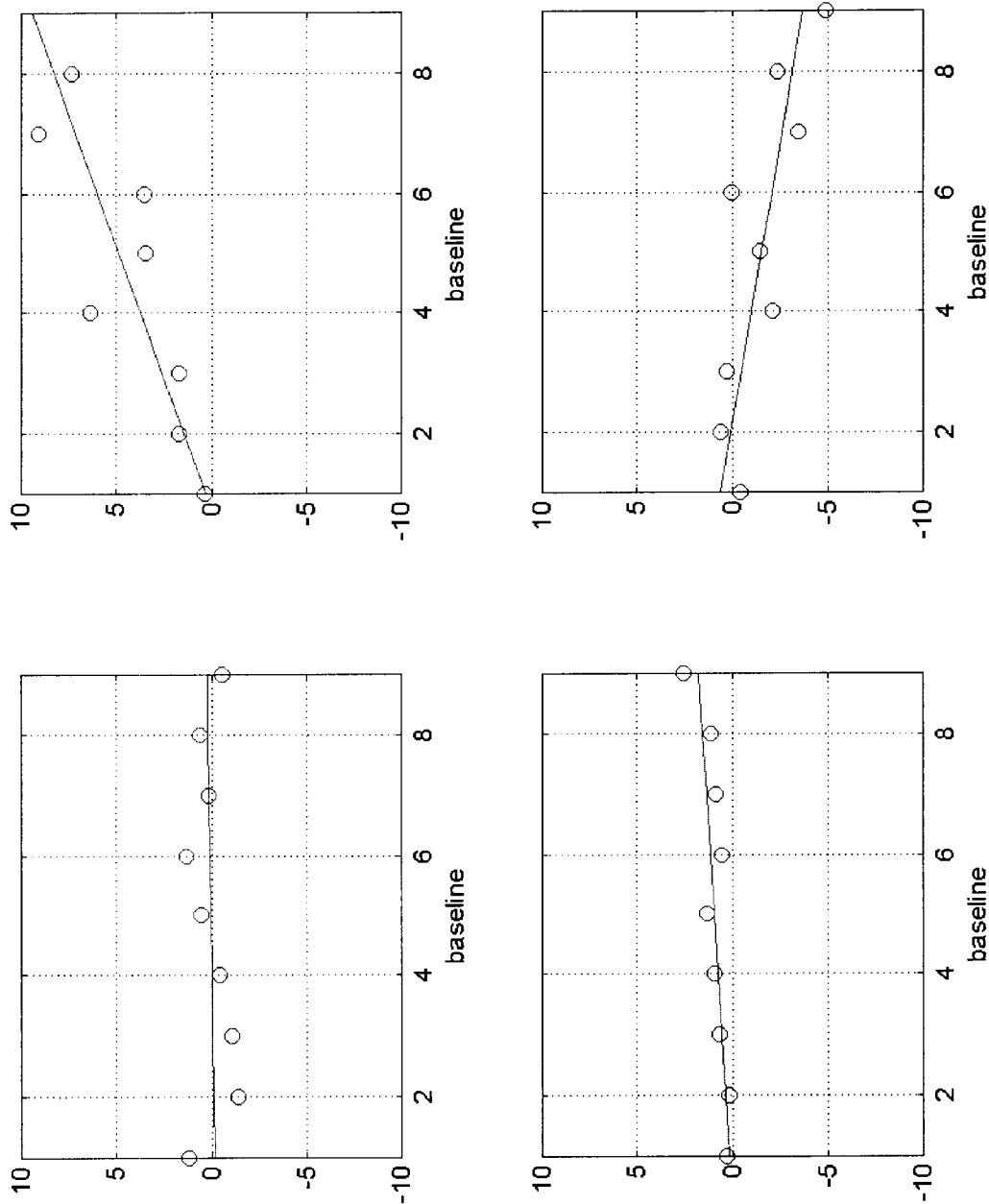
FIG. 4 shows four examples relative to four different pixels of an interferogram of FIG. 3.

In FIG. 4 four examples relative to four different pixels of an interferogram are shown.

According to what is illustrated in said Figure four diagrams of the interferometric phases 127, 116, 117 and 118 can be noted having as axis of the x-coordinates the baseline variable and as axis of the ordinates the interferometric phase in relation to the master.

Each diagram consists of a multiplicity of points and a straight line which is the result of the interpolation of said points.

The phase linear component is calculated for every temporal series 127, 116, 117 and 118 in relation to the baseline, that is the inclination a of the straight line of equation Φ=aB+C (where C is a constant) to the squared minimum is estimated and which minimises the following expression:

$$\sum_{1}^{q} {}_i (\Phi_i - aB - C)^2$$

Then the error between the precise elevation of the pixel and that supplied by the reference DEM is associated to the phase linear component in relation to the baseline by using the following formula:

$$\Delta q = a \cdot \frac{\lambda \rho \sin\theta}{4\pi}$$

In this way the relative topography error can be detected, which is connected to the inclination a of the interpolated line, which is more suitable for the data extracted from the interferometric phases.

Figure 5:
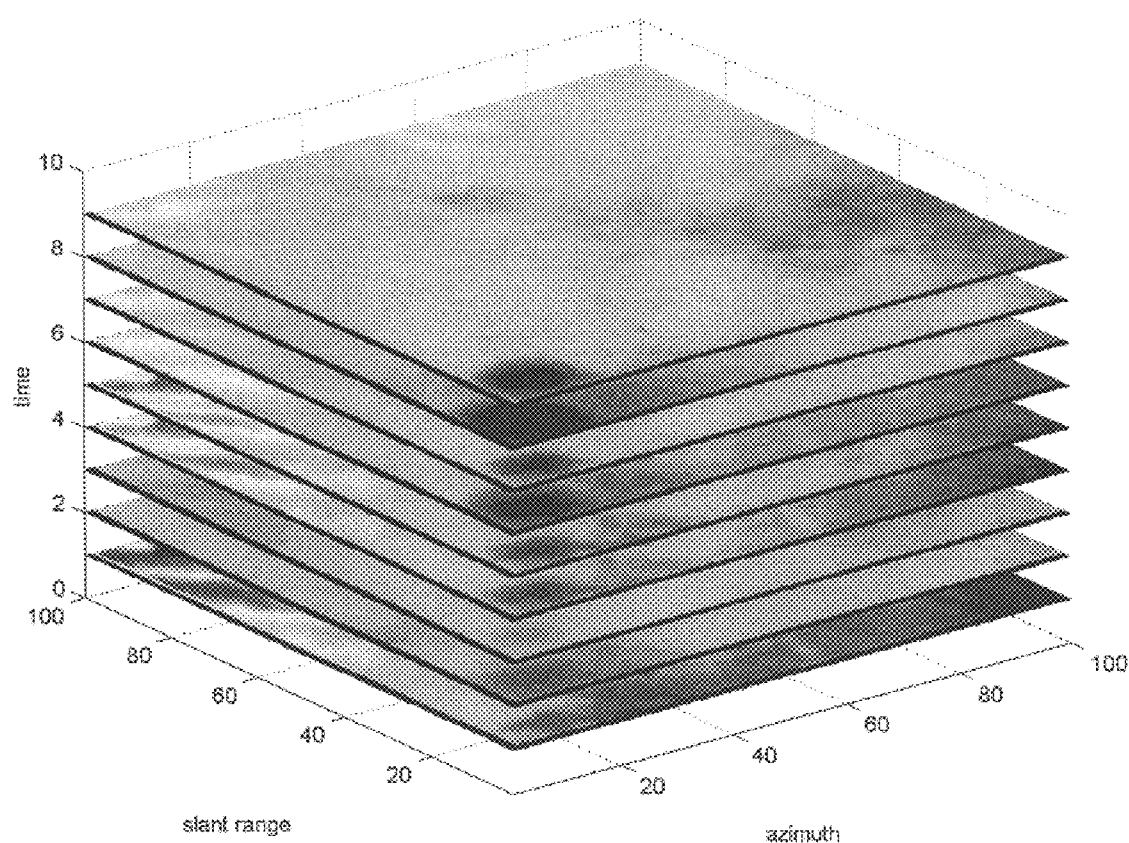
FIG. 5 illustrates a three-dimensional graph of nine interferograms in function of the time.

In FIG. 5 nine interferograms in function of the time generated by the same master image are shown.

According to what is illustrated in said Figure it can be noted that every interferogram refers to the same ground surface area, but has a different instant, axis t (time).

Four pixels belonging to a specific interferogram are identified with 119, 120, 121 and 122 as well.

Having the nine interferograms available and taking one single point 119, belonging to one of the interferograms, this has a phase relative to a reference pixel which varies linearly in time (having assumed a constant speed subsidence model) and therefore a signal is made, evidently monodimensional, as is hereunder described with reference to FIG. 6.

The method is the same for pixels 120, 121 and 122 which give rise to the same number of monodimensional signals.

Figure 6:
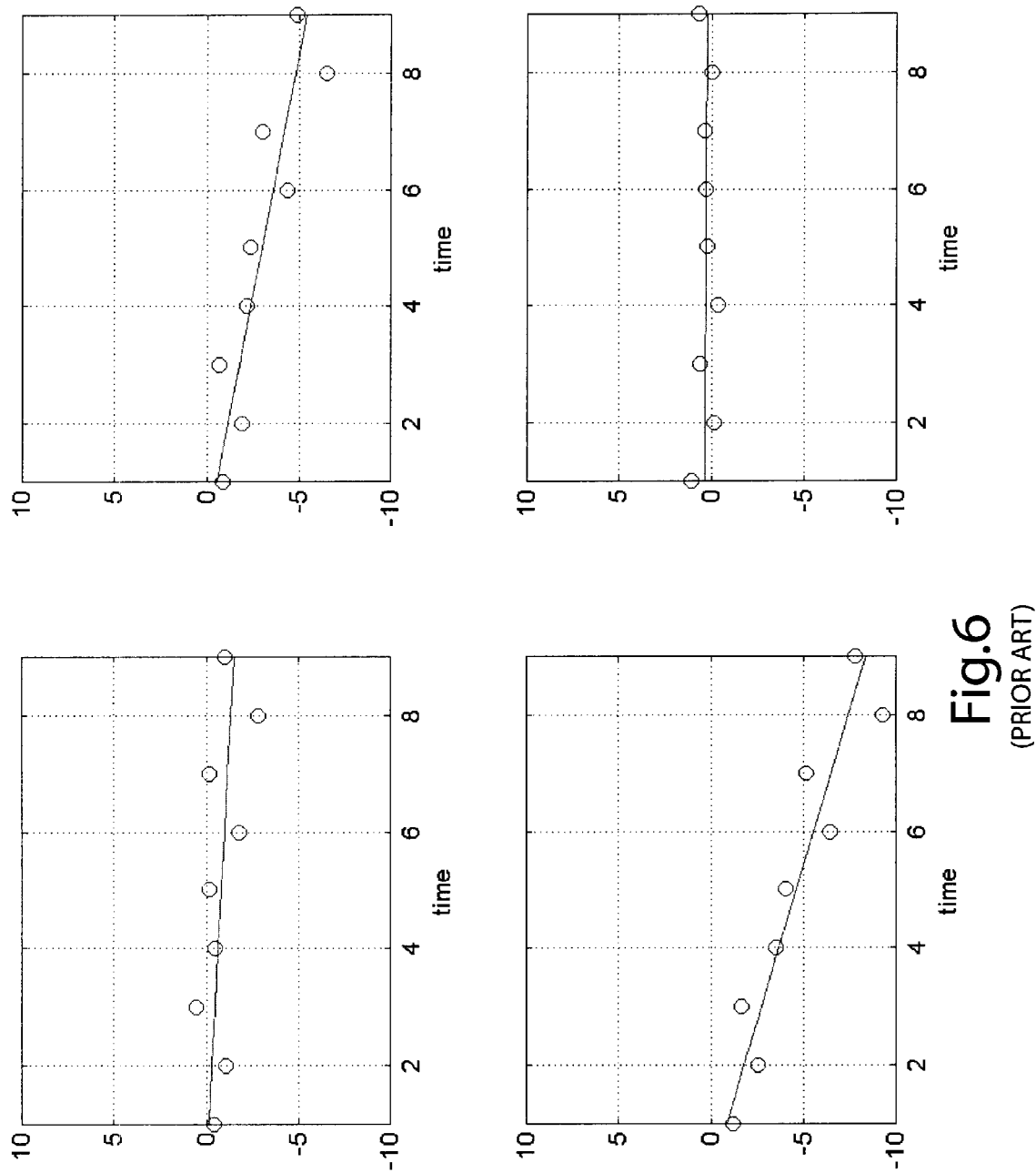
FIG. 6 shows four examples relative to four different pixels of an interferogram of FIG. 5.

In FIG. 6 four examples relating to four different pixels of an interferogram of FIG. 5 are shown.

According to what is illustrated in said Figure four diagrams of the interferometric phases 123, 124, 125 and 126 can be noted, having the time variable as axis of the x-coordinates, and the interferometric phase variable in relation to the master as axis of the ordinates.

Each diagram consists of a multiplicity of points and of a straight line which is the result of the interpolation of said points.

Supposing that we have a subsidence model available, that is a sinking movement of the earth's crust at a constant speed which occurs in certain zones called geosynclines, the entity of said movement is estimated by determining to the squared minimum the inclination k of the straight line Φ=kt which minimises the following expression:

$$\sum_{1}^{q} {}_j (\Phi_j - kt)^2$$

In this manner we can find the subsidence speed which is connected to the inclination k of the interpolated straight line which is more suitable for the data extracted from the interferometric phases.

Figure 7:
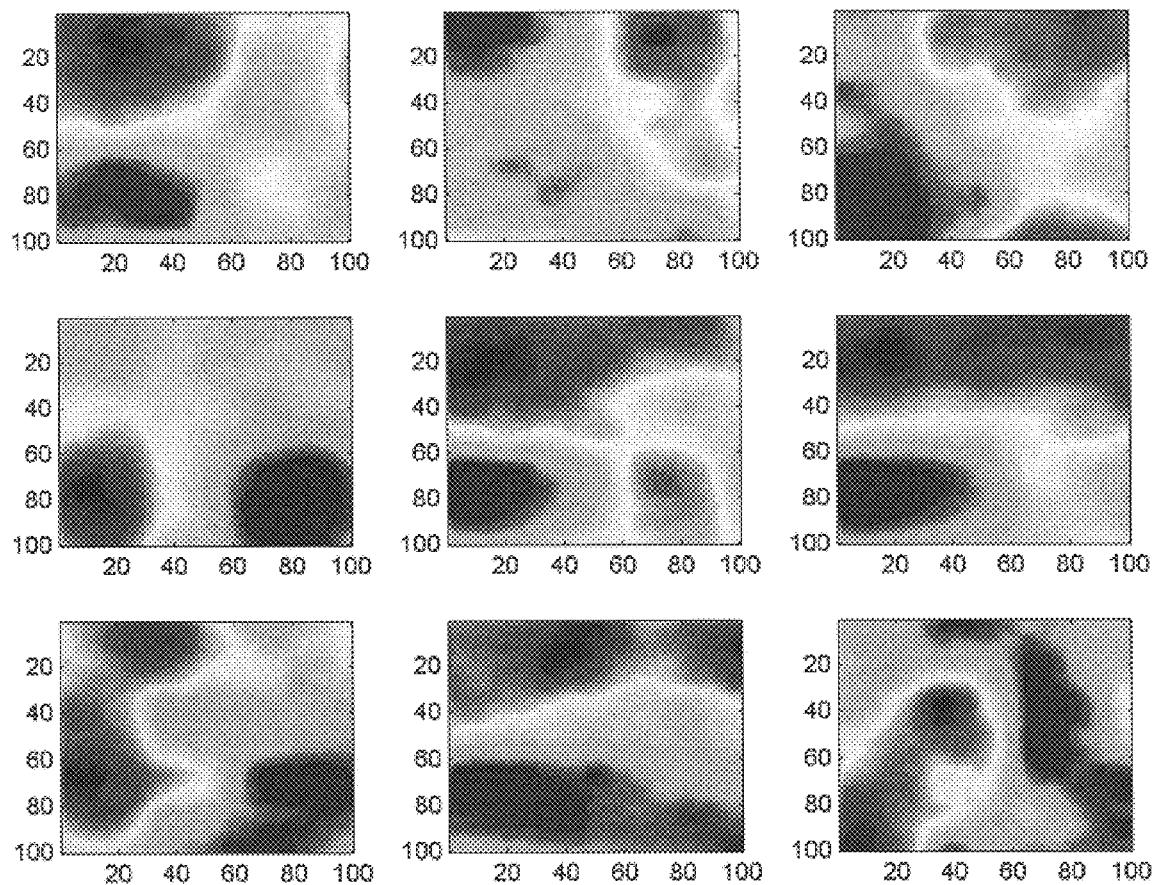
FIG. 7 illustrates the differential contributions of the atmosphere of the single images compared to the main image ("master")

FIG. 7 represents differential interferograms having azimuth variable on the x-axis and the range variable on the y-axis.

According to what is illustrated in said interferograms, the phase residuals are made after subtracting, by using a known computer program, the contributions given by the error between the precise elevation of the pixel and that supplied by the reference DEM and the movement of the pixels in the direction of the satellite radar.

Figure 8:
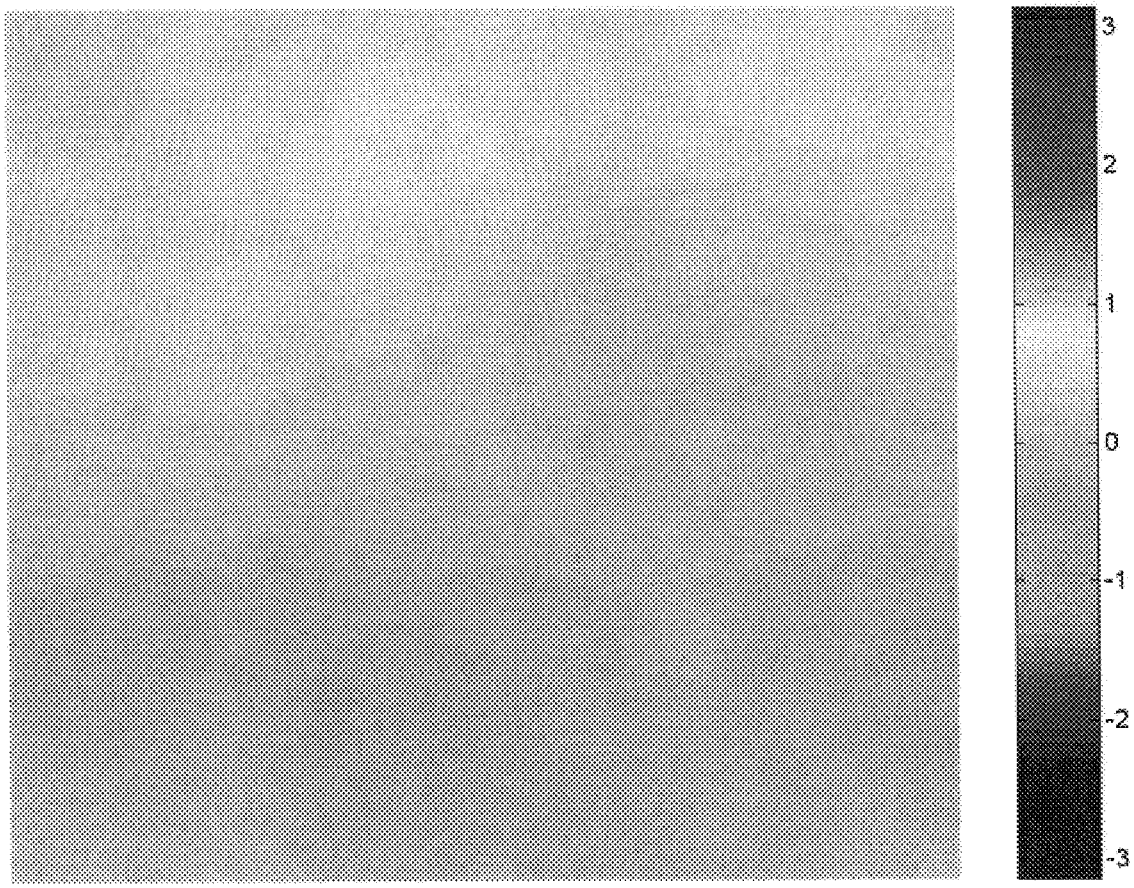
FIG. 8 shows an estimation of the atmospheric contribution present on the master image.

FIG. 8 shows an estimation of the atmospheric contribution present on the master image, obtained by making an arithmetic average of the phase residuals of FIG. 7.

In said Figure it can be noted that the image presents a graduation scale indicating the phase in radians.

The estimation of the contribution present on the master image can be subtracted, again by using a known computer program, from the differential atmospheric contributions seen in FIG. 7 giving as result the atmospheric contribution present on every single image, called Atmospheric Phase Screen (APS).

Figure 9:
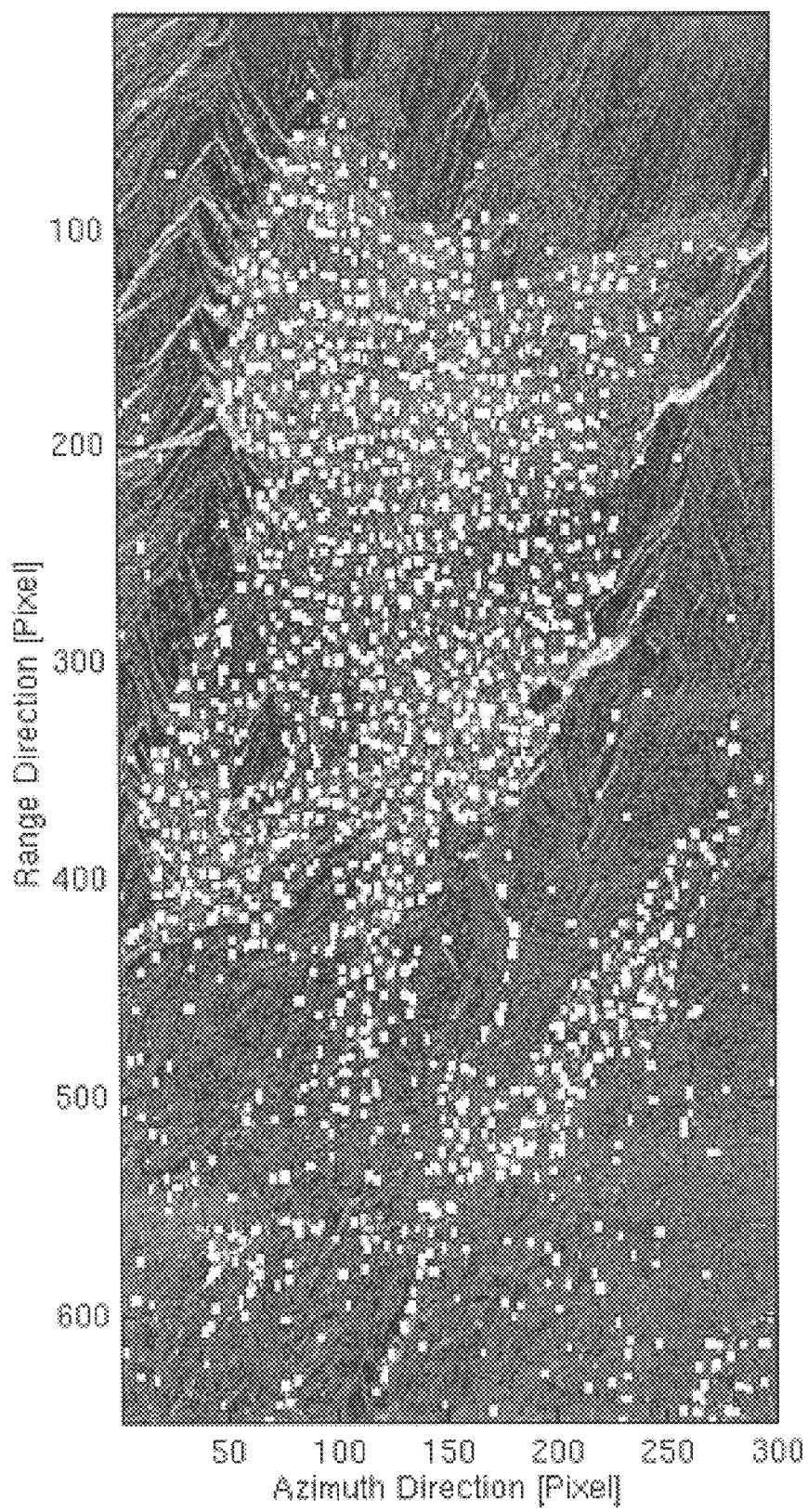
FIG. 9 illustrates a real example of the localisations and of the spatial densities of the stable scatterers (called PS) over a three-year time.

FIG. 9 shows a real example of the localisation and the density of the stable scatterers in time. According to what is illustrated in said Figure, an axis of the x-coordinates indicating the azimuth direction and an axis of the ordinates indicating the range direction can be noted. The unit for measuring the axes if the pixel.

A plurality of points that identify the stable pixels in time can be noted as well.

In fact the sequence of the operations described in the previous figures cannot be carried out on all the image pixels, but only on those that keep their physical characteristics (PS) during the interval of time in which all the images of the temporal series have been acquired.

This analysis is carried out in two steps: first, PS candidates are selected on the statistical properties of the modulus of the reflectivity, then the spectral power density of the phase residuals is analysed and if the residuals relating to each single image are spatially correlated, attributed to atmospheric artefacts and removed; if the further residual dispersion relating to each single image is too large the pixel is discarded.

When the number of stable scatterers per surface unit is sufficient, at least twenty five PS per $Km^2$, the phase residuals obtained from the subtraction of the phase contribution due to precise elevation of the pixel and movement of the pixel in the direction of the satellite radar, are sufficient for reconstructing the atmospheric artefact of each single image through a low-pass interpolation on the uniform image grid.

This artefact can therefore be removed from each SAR image improving the quality of the DEM and therefore using the interferometric phases, filtered of the atmospheric artefact found with the method previously described, we have an improvement of the degree of correlation of the pixels, classified as PS.

Figure 10:
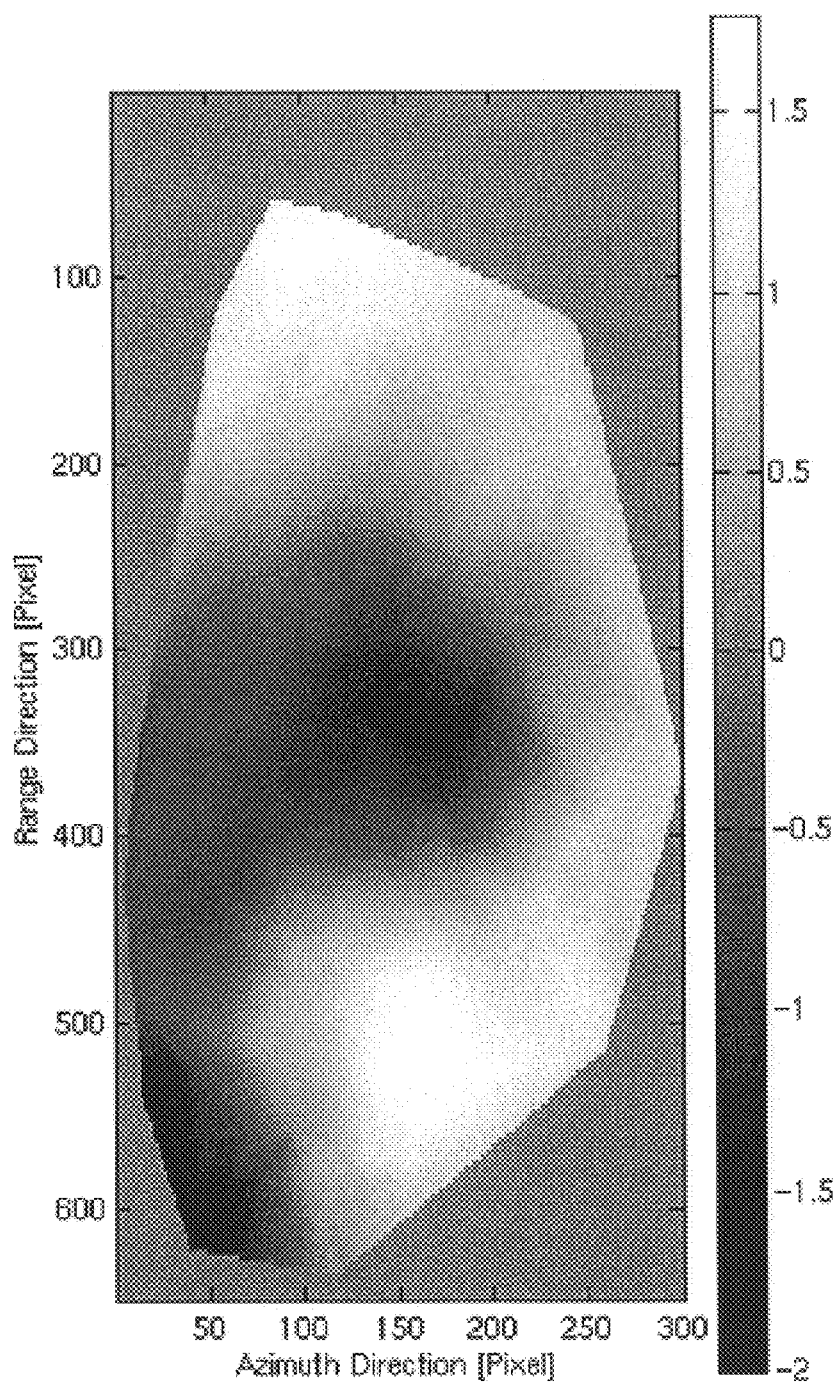
FIG. 10 shows a real example of the present invention made on the Valle del Bove (Etna)

FIG. 10 shows a real image of the present invention of a temporal series on the Valle del Bove (Etna).

According to what is illustrated in said Figure it can be noted that the axis of the x-coordinates indicates the azimuth direction, while the axis of the ordinates indicates the range direction. Both axes have the pixel as unit of measure.

A grade indicator indicating the phase in radians can also be noted. The Figure shows the atmospheric outlines relating to an image of the temporal series on the Valle del Bove estimated by interpolating the results obtained in correspondence with the stable scatterers, that is the PS, seen in FIG. 9.

Figure 11:
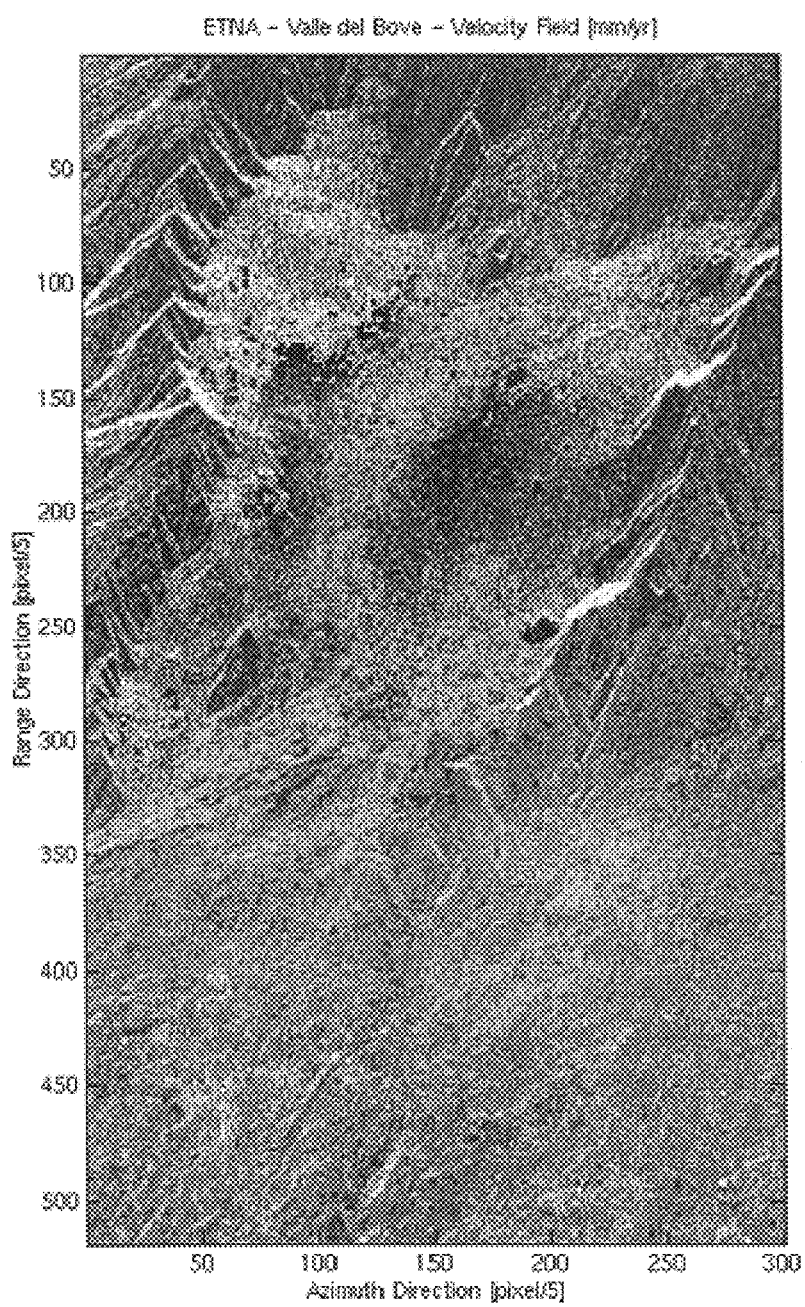
FIG. 11 is a colour representation that illustrates a real example of the subsidence rates of the Valle del Bove (Etna).

FIG. 11 shows the subsidence movement in terms of velocity field estimated on the Valle del Bove (Etna) in correspondence with the stable scatterers, that is the PS, of FIG. 10.

In said Figure an axis of the x-co-ordinates indicating the azimuth direction can be noted and also an axis of the ordinates indicating the range direction. Both axes have pixel/5 as unit of measure.

It can also be noted that the image is composed of a plurality of points, coloured in different manners. This means that the red ones have the value of a subsidence speed of about four centimeters per year while the green ones have the value of zero speed.

What is claimed is:

1. Process for radar measurements of movements of city areas and landsliding zones which, having N>20 images made available by a synthetic aperture radar or SAR over a multi-year period, identifies for every resolution cell, the scatterers whose electromagnetic characteristics remain unaltered over time, and which are called Permanent Scatterers or PS, characterized in that said PS are identified through the following steps:
   (a) N−1 differential interferograms are formed in relation to the main image, called master, using a digital elevation model or DEM with vertical accuracy better than 50 meters;
   (b) for every pixel of the image of point (a) selected on the statistical properties of the modulus of the reflectivity, a temporal series of the interferometric phases is generated, and then, differences among temporal series that belong to neighbouring pixels are formed;
   (c) for every differential temporal series of point (b) the linear phase components are calculated in relation to the baseline and the phase components connected to the displacement model, already known, in relation to the time;
   (d) the relative error between the precise elevation of the pixel supplied from DEM of point (a) is associated with the linear phase component of point (c) in relation to the baseline;
   (e) the relative movement of the pixel in the direction of the SAR is associated to the polynominal phase variation in relation to the time of point (c);
   (f) the phase residuals are formed by subtracting the contributions calculated at points (d) and (e) after a phase unwrapping procedure on the sparse grid of the previously selected pixels;
   (g) the spectral power density of the phase residuals is analysed and (g.1) if the residuals relating to each single image are spatially correlated, attributed to atmospheric artefacts and removed; if (g.2) the further residual dispersion relating to each single image is too large the pixel is discarded.

2. Process according to claim 1, characterised in that: (h) given a number of PS per surface unit>25/$Km^2$, after processing the phase residuals, the atmospheric artefact of every single image is determined and subtracted from the reference DEM, improving its vertical precision.

3. Process according to claim 2, characterised in that the process steps (b), (c), (d), (e), (f) and (g) are reiterated, using the interferometric phases filtered of the atmospheric artefact according to step (h).

* * * * *